(12) United States Patent
Mahajan et al.

(10) Patent No.: US 10,944,562 B2
(45) Date of Patent: Mar. 9, 2021

(54) AUTHENTICATING A MESSAGING PROGRAM SESSION

(71) Applicant: Apple Inc., Cupertino, CA (US)

(72) Inventors: Mayur P. Mahajan, Belmont, CA (US); Gokul P. Thirumalai, Mountain View, CA (US); Scott Lopatin, San Francisco, CA (US); Tommy Rochette, San Jose, CA (US); Robert Y. Loh, Sunnyvale, CA (US); Yannick L. Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 16/221,043

(22) Filed: Dec. 14, 2018

(65) Prior Publication Data

US 2019/0372767 A1    Dec. 5, 2019

Related U.S. Application Data

(60) Provisional application No. 62/679,886, filed on Jun. 3, 2018.

(51) Int. Cl.
*H04L 29/06* (2006.01)
*H04L 9/32* (2006.01)
*H04L 12/58* (2006.01)
*H04L 9/08* (2006.01)

(52) U.S. Cl.
CPC .......... *H04L 9/3213* (2013.01); *H04L 9/0822* (2013.01); *H04L 9/3226* (2013.01); *H04L 51/046* (2013.01)

(58) Field of Classification Search
CPC . H04L 63/08; H04L 63/0807; H04L 63/0823; H04L 63/0853; H04L 63/0869; H04L 63/0861; H04L 9/3213; H04L 9/0822; H04L 9/3226; H04L 51/046
See application file for complete search history.

(56) References Cited

U.S. PATENT DOCUMENTS

| | | | |
|---|---|---|---|
| 9,391,998 B2 | 7/2016 | Fletcher et al. | |
| 9,432,340 B1 | 8/2016 | Tutt et al. | |
| 10,484,851 B2* | 11/2019 | Rosenberg | H04W 12/06 |
| 2005/0164721 A1 | 7/2005 | Eric Yeh et al. | |
| 2007/0007358 A1* | 1/2007 | White | G07G 1/009 |
| | | | 235/492 |

(Continued)

FOREIGN PATENT DOCUMENTS

WO    2016126151    8/2016

*Primary Examiner* — Malcolm Cribbs
(74) *Attorney, Agent, or Firm* — Kowert, Hood, Munyon, Rankin & Goetzel, P.C.

(57) ABSTRACT

Techniques disclosed herein relate to the authentication of a first user in a communication session between the first user using a user device and a second user using a remote computer system. The computer system sends an authentication request in the session, and the user device receives the authentication request in the session via a messaging program. The user device then causes a different program to access an authentication token received from an authentication computer system. The user device sends an indication of the authentication token to the remote computer system which the remote computer system verifies to authenticate the first user within the session.

20 Claims, 9 Drawing Sheets

(56) References Cited

U.S. PATENT DOCUMENTS

| | | | |
|---|---|---|---|
| 2007/0079356 A1* | 4/2007 | Grinstein | H04L 9/3226 |
| | | | 726/2 |
| 2010/0227631 A1 | 9/2010 | Bolton et al. | |
| 2011/0252146 A1 | 10/2011 | Santamaria et al. | |
| 2012/0300932 A1 | 11/2012 | Cambridge et al. | |
| 2012/0311329 A1* | 12/2012 | Medina | H04L 63/0442 |
| | | | 713/168 |
| 2014/0279489 A1 | 9/2014 | Russell et al. | |
| 2014/0298479 A1 | 10/2014 | Stass et al. | |
| 2015/0269575 A1 | 9/2015 | Narayanan et al. | |
| 2018/0332042 A1* | 11/2018 | Yu | G06F 21/31 |

* cited by examiner

AUTHENTICATING A MESSAGING PROGRAM SESSION

This application claims the benefit of U.S. Prov. Appl. No. 62/679,886 filed on Jun. 3, 2018, which is incorporated by reference herein in its entirety.

BACKGROUND

Technical Field

This disclosure relates generally to authenticating a first user communicating with a second user, particularly in the context of a session that is facilitated by a messaging program.

Description of the Related Art

Messaging programs facilitate communication between users of the messaging programs by allowing the users to send messages to one another. These messaging programs may associate the various messages exchanged between the users into sessions. Users might have any of a number of reasons to communicate with one another via the messaging programs. Some of these communications, though, may relate to personal information, financial information, or other sensitive information that one or more of the users desires to keep confidential.

SUMMARY

The present disclosure concerns the authentication of a first user of a user device in a communication session between the first user and a second user. An exemplary computer system, messaging computer system, user device, and authentication computer system communicate to enable the first user of the user device to be authenticated in a communication session with a second user of the computer system. The computer system sends an authentication request to the messaging computer system requesting information useable to authenticate the first user in the session. In turn, the messaging computer system sends an authentication request to the user device, which receives the authentication request using a messaging program running on the user device. Upon receiving the authentication request, the user device causes a different program running on the user device to access an authentication token useable to authenticate the first user in the session. In some embodiments, the different program has previously received the authentication token from the authentication computer system, but in other embodiments the different program communicates with the authentication computer system to request the authentication token. Upon receiving the token access request from the user device, the authentication computer system receives verification information from the user device, and upon receiving the verification information sends the authentication token to the user device. After receiving the authentication token, the user device sends an indication of the authentication token to the messaging computer system, which in turn sends the indication of the authentication token to the computer system. The computer system receives the indication of the authentication token and verifies the indication to authenticate the first user within the communication session.

Figure 1:
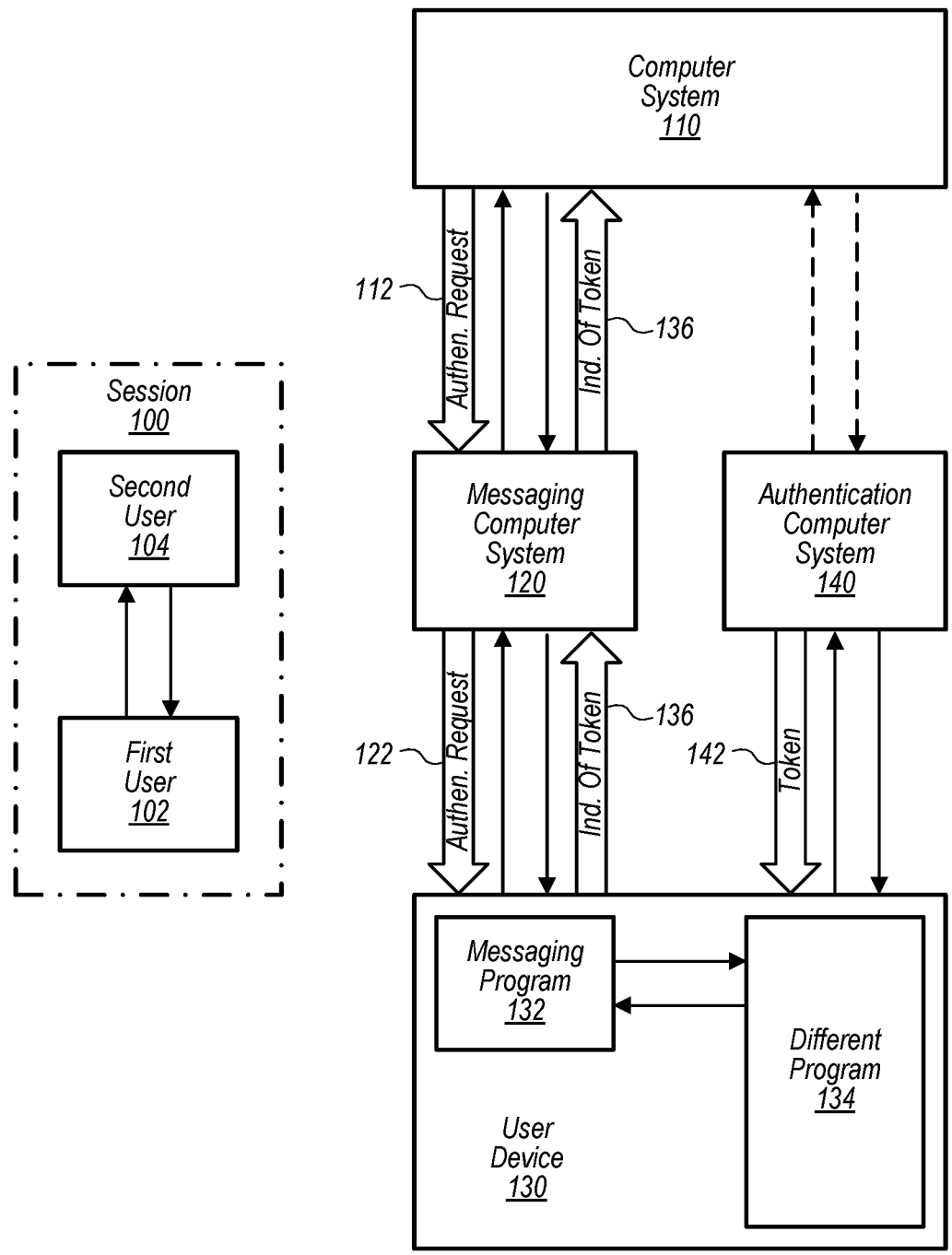
FIG. 1 is a block diagram illustrating an embodiment of a computer system, a messaging computer system, a user device, and an authentication computer system in accordance with various embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive an authentication request" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" user devices would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Referring now to FIG. 1, a block diagram illustrates an exemplary embodiment of a computer system 110, a messaging computer system 120, a user device 130, and an authentication computer system 140 and the various ways they communicate with one another as part of facilitating a session 100 between a first user 102 and a second user 104.

Session 100 is a series of communications between first user 102 and second user 104. As discussed herein, session 100 is facilitated by messaging computer system 120 and messaging program 132 as discussed herein. As used herein, the term "facilitate" broadly refers to acts that contribute to the ability of first user 102 to communicate with second user 104 in session 100. For example, facilitating includes but is not limited to receiving messages, storing messages, sending received messages to other computer systems, displaying received messages, and/or associating received messages with a particular session 100. In various embodiments, session 100 includes text communication exchanged between first user 102 and second user 104. In various embodiments, first user 102 and second user 104 exchange visual information, audio information, and/or textual communication information communicated via messaging program 132 during session 100. In various embodiments, first user 102 initiates session 100, but in other embodiments, second user 104 initiates session 100. In some embodiments, session 100 begins as a result of previous communications occurring outside session 100 (e.g., first user 102 sends a request to second user 104 via a webpage for second user 104 to initiate a session 100 when customer service personnel of second user 104 are available to communicate). In various embodiments discussed herein, computer system 110, messaging computer system 120, user device 130, and/or authentication computer system 140 are configured to store indications of session 100 (e.g., an identifier associated with session 100, messages exchanged between first user 102 and second user 104, etc.). Further, computer system 110, messaging computer system 120, user device 130, and/or authentication computer system 140 may be configured to display the various messages in session 100 (e.g., to first user 102 via a user interface of user device 130, to second user 104 via a user interface of computer system 110, to other users via user interfaces of the messaging computer system 120 and/or authentication computer system 140). A session 100 may have a limited duration (e.g., the session ends after 30 minutes after the last message sent from one user to another user), but in other embodiments a session 100 can remain active indefinitely. Session 100 is discussed in further detail in reference to FIG. 9.

In various embodiments, first user 102 is a natural person who has access to user device 130. In such embodiments, first user 102 has a relationship with second user 104 and the communications with second user 104 in session 100 are relevant to the relationship. For example, in some embodiments first user 102 is a customer, client, member, contractee, employee, or agent of second user 104. More particularly, in some embodiments, first user 102 is a customer that has purchased (or is interested in purchasing) goods from second user 104. In another example, first user 102 is an account holder with second user 104, which is a financial institution. In another example, first user 102 is an employee or contractor with second user 104 seeking to receive confidential information from second user 104. In various embodiments, second user 104 is a natural person, but in other embodiments second user 104 is a company or organization. In various embodiments, the entity that communicates with first user 102 during session 100 is one or more natural people acting on the behalf of the second user 104. In other embodiments, the entity that communicates with first user 102 during session 100 is software that is capable of parsing first user's 102 communications and responding accordingly. In various embodiments, the entity communicating with first user during session 100 is a combination of software and one or more natural people (e.g., software that handles the initial portion of session 100 with a natural person taking over once the discussion in session 100 becomes more complicated).

The various components shown in FIG. 1 may communicate with one another in any of a number of ways including wired communication, wireless communication, or a combination using any suitable communication protocol (e.g., http). In various embodiments, computer system 110, messaging computer system 120, user device 130, and/or authentication computer system 140 communicate directly (e.g., the computer system 110 directly communicates with messaging computer system 120). In other embodiments, however, the computer system 110, messaging computer system 120, user device 130, and/or authentication computer system 140 communicate via intermediaries (e.g., over local area networks, over wide area networks). In various embodiments, computer system 110, messaging computer system 120, user device 130, and/or authentication computer system 140 are connected to the Internet.

Computer system 110 is one or more computer systems that second user 104 utilizes to communicate with first user 102 in session 100. In various embodiments, computer system 110 is remote from messaging computer system 120, user device 130, and/or authentication computer system 140. Computer system 110 is configured to send messages to and receive messages from messaging computer system 120. As discussed herein, in various embodiments, computer system 110 is also configured to send messages to and receive messages from authentication computer system 140. In such embodiments, computer system 110 sends authentication request 112 to authenticate first user 102 within the session 100. In these embodiments, computer system 110 sends authentication request 112 via messaging computer system 120 to messaging program 132 running on user device 130.

As discussed herein, after sending authentication request 112, computer system 110 receives an indication 136 of an authentication token 142 that user device 130 received from authentication computer system 140. In such embodiments, computer system 110 receives indication 136 from messaging program 132 running on user device 130 via messaging computer system 120. After receiving indication 136, computer system 110 verifies the indication 136 to authenticate first user 102 within session 100. In various embodiments, indication 136 includes an encrypted version of authentication token 142 received from authentication computer system. In such embodiments, computer system 110 verifies the indication 136 by decrypting the encrypted authentication token 142 and comparing the authentication token 142 to an expected value of the token stored at computer system 110. In various embodiments, verification of the indication 136 includes computer system 110 communicating with authentication computer system 140 as discussed herein. Computer system 110 and its various components are discussed herein in further detail with reference to FIG. 2.

Messaging computer system 120 is one or more computer systems that facilitates communications between first user 102 and second user 104 in session 100. In various embodiments, messaging computer system 120 is remote from computer system 110, user device 130, and/or authentication computer system 140. Messaging computer system 120 is configured to receive messages from computer system 110 and user device 130 and to send messages to computer system 110 and user device 130. Further, messaging computer system 120 is configured to relay communications from computer system 110 to user device 130 and relay communications from user device 130 to computer system 110. In various embodiments, these relayed communications are associated with session 100 (e.g., by storing an indication of session 100 and sending a reference to this indication along with the relayed messages).

User device 130 is one or more computer systems that first user 102 utilizes to communicate with second user 104 in session 100. In various embodiments, user device 130 is remote from computer system 110, messaging computer system 120, and/or authentication computer system 140. User device 130 is configured to send messages to and receive messages from messaging computer system 120. User device 130 is configured to run at least one messaging program 132 and at least one different program 134. Messaging program 132 facilitates session 100 between first user 102 of user device 130 and second user of a computer system 110. User device 130 is configured to receive authentication request 122 via messaging program 132 within session 100. In response to authentication request 122, user device 130 causes different program 134 to access an authentication token 142 received from an authentication computer system 140. As discussed herein, in various embodiments user device 130 already has authentication token 142 (e.g., in storage 300) and different program 134 access this previously-received authentication token 142, but in other embodiments, user device 130 causes different program 134 to request authentication token 142 from authentication computer system 140. After accessing authentication token 142, user device 130 uses messaging program 132 to send an indication 136 of authentication token 142 to computer system 110. As discussed herein, in various embodiments the indication 136 includes authentication token 142 (in encrypted or unencrypted form) or a reference to authentication token 142, and authentication token 142 is useable by computer system 110 to authenticate first user 102 within session 100. User device 130, messaging program 132, and different program 134 are discussed herein in further detail with reference to FIG. 3. Authentication token 142 and indication 136 of authentication token 142 are discussed herein in further detail with reference to FIG. 4.

Authentication computer system 140 is one or more computer systems that generates, stores, distributes, and/or verifies authentication tokens 142. In various embodiments, authentication computer system 140 is remote from computer system 110, messaging computer system 120, and/or user device 130. Authentication computer system 140 is configured to send messages (including authentication token 142) to and receive messages from user device 130. As discussed herein, in various embodiments, authentication computer system 140 is also configured to send messages to and receive messages from computer system 110.

Authentication computer system 140 is configured to receive a token access request from different program 134 running on user device 130. In such embodiments, the token access request is generated by different program 134 using a resource locator that was included in the authentication request 122 that was received by user device 130 via messaging program 132. In various embodiments, authentication computer system 140 communicates with computer system 110 to enable computer system 110 to verify authentication token 142 (e.g., in a verification request 412 discussed with reference to FIG. 4).

As discussed in further detail with reference to FIG. 4, computer system 110 sends an authentication request 112 to messaging computer system 120. In turn, messaging computer system 120 sends authentication request 122 to message program 132 running on user device 130. Authentication computer system 140 sends an authentication token 142 to user device 130. In various embodiments, user device 130 receives the authentication token 142 using different program 134 (e.g., a web browser, a dedicated application), messaging program 132, and/or another program (e.g., an operating system of user device 130). After accessing the authentication token 142, messaging program 132 sends an indication 136 of the authentication token 142 to messaging computer system 120. In turn, messaging computer system 120 relays the indication 136 to computer system 110. Authentication request 112, authentication request 122, authentication token 142, and indication 136 of authentication token 142 are discussed herein in further detail with reference to FIG. 4.

As discussed herein, the disclosed techniques enable first user 102 and second user 104 to communicate in a session 100 facilitated by messaging program 134 and messaging computer system 120 with second user 104 having assurance of first user's 102 identity. In such embodiments, because this assurance is an authentication token 142 received by user device 130 from authentication computer system 140 that user device 130 accessed using different program 134, the information exchanged between user device 130 and authentication computer system 140 (e.g., the verification information 310 discussed in connection to FIGS. 3 and 4) is not sent to messaging computer system 120. Further, in embodiments where indication 136 includes an encrypted version of authentication token 142, messaging computer system 120 similarly does not have access to the authentication token 142 either.

Figure 2:
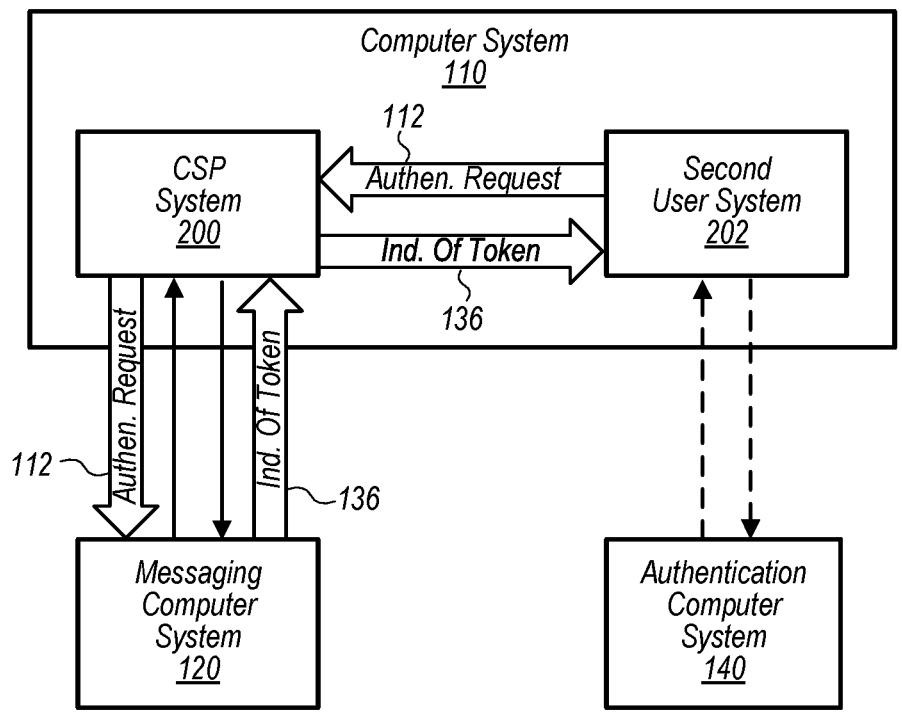
FIG. 2 is an expanded block diagram of the computer system of FIG. 1 in accordance with various embodiments.

Referring now to FIG. 2, an expanded block diagram of the computer system 110 of FIG. 1 is depicted in accordance with various embodiments. As shown in FIG. 2, computer system 110 includes customer service provider (CSP) system 200 and second user system 202. While only one of each is shown in FIG. 2, it will be understood that computer system 110 may include a plurality of CSP systems 200 and a plurality of user systems 202 (e.g., a second user system 202, a third user system [not shown], an nth user system [not shown]). Further, CSP system 200 and second user system 202 may each be implemented on a single computer system or multiple computer systems (e.g., implemented on a cloud or clouds). In various embodiments, computer system 110 does not include a CSP system 200, but instead includes only second user system 202. In such embodiments, second user system 202 performs the actions that are attributed herein to CSP system 200 (e.g., communicating with messaging computer system 120) as well as the actions attributed to second user system 202 (e.g., communicating with second user 104, communicating with authentication computer system 140).

CSP system 200 is one or more computer systems that second user 104 utilizes (via second user system 202) to communicate with first user 102 in session 100. In various embodiments, CSP system 200 is remote from messaging computer system 120, user device 130, authentication computer system 140, and/or second user system 202. CSP system 200 is configured to send messages to and receive messages from messaging computer system 120. In various embodiments, second user 104 interacts with CSP system 200 via second user system 202, but in some embodiments second user 104 interacts with CSP system 200 directly. For example, in some embodiments, the entity communicating with first user 102 on second user 202's behalf is an agent or employee of a CSP company to which second user 104 has outsourced the task of communicating with first user 102 in session 100. In various embodiments, CSP system 200 facilitates communication between second user system 202 and messaging computer system 120 including relaying authentication request 112 from second user system 202 to messaging computer system 120 and relaying indication 136 of authentication token 142 from messaging computer system 120 to second user system 202. In various embodiments, however, the various steps relating to authentication of first user 102 within session 100 disclosed herein are performed by CSP system 200. In such embodiments, second user 104 uses second user system 202 to communicate with first user 102 (e.g., to perform the customer service interactions relating to first user's 102 account with second user 104), but CSP system 200 generates authentication request 112 and verifies indication 136 to authenticate first user 102.

Second user system 202 is one or more computer systems that second user 104 utilizes to communicate with first user 102 in session 100. In various embodiments, second user system 202 is remote from messaging computer system 120, user device 130, authentication computer system 140, and/or CSP system 200 (if present). Second user system 202 is configured to send messages to and receive messages from CSP system 200 (if present). Alternatively, second user system 202 is configured to send messages to and receive message from messaging computer system 120 if CSP system 200 is not present.

In various embodiments, second user system 202 (or CSP system 200 in embodiments where CSP system 200 verifies indication 136 to authenticate first user 102 in session 100), generates authentication request 112 and analyzes indication 136 to authenticate first user 102 in session 100. As discussed in further detail in reference to FIG. 4, authentication request 112 includes an authentication request identifier (e.g., a unique alphanumeric or binary code associated with a particular authentication request 112) and a first cryptographic key 404 (e.g., a public key of a public-private key pair). Second user system 202 stores a second cryptographic key that corresponds to first cryptographic key 404 (e.g., the private key of the public-private key pair) that is useable to decrypt information encrypted using first cryptographic key 404. In some of such embodiments, indication 136 received by second user system 202 includes authentication token 142 encrypted using the first cryptographic key 404 and an authentication request response identifier (e.g., a unique alphanumeric or binary code associated with a particular indication 136). In such embodiments, second user system 202 (or CSP system 200 in some embodiments) verifies the indication 136 by decrypting the encrypted authentication token 142 using the second cryptographic key that corresponds to the first cryptographic key 404 and determining that the authentication request response identifier corresponds to the authentication request identifier.

In some embodiments, the second user system 202 (or CSP system 200 in some embodiments) verifies the received indication 136 by sending a verification request 412 based on the indication 136 of the authentication token 142 received from user device 130 to authentication computer system 140. In response to the verification request 412, second user system 202 receives from authentication computer system 140 a second indication of the authentication token 142 that corresponds to the indication 136. Second user system 202 analyzes the indication 136 and the second indication received in response to the verification request 412 to determine whether the indication 136 and second indication correspond to the same authentication token 142.

Figure 3:
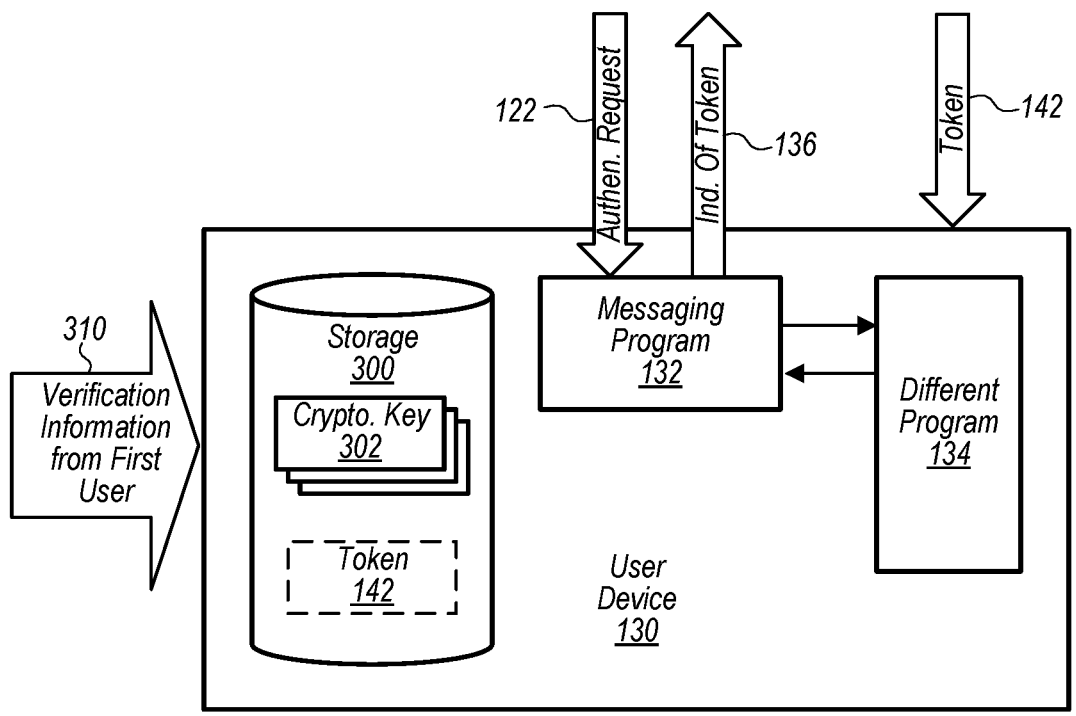
FIG. 3 is an expanded block diagram of the user device of FIG. 1 in accordance with various embodiments.

Referring now to FIG. 3, an expanded block diagram of the user device 130 of FIG. 1 is depicted in accordance with various embodiments. In various embodiments, user device 130 may be any of a number of computing devices including but not limited to a desktop computer, a laptop computer, a tablet computer, a smartphone, a mobile device, wearable computer (e.g., smartwatch, smart glasses), etc. As shown in FIG. 3, user device 130 includes messaging program 132, different program 134, and storage 300. While only one of each is shown in FIG. 3, it will be understood that user device 130 may include more than one of all of these modules.

Messaging program 132 may be any of a number of programs useable to send and receive messages and keep them organized in one or more sessions 100. In various embodiments, messaging program 132 is an instant messaging program that facilitates online chat using real-time text transmission over the Internet (e.g., the iMessage™ program distributed by Apple, Inc.™). In various embodiments, messaging program 132 is useable to send and receive text information, audio information, visual information, or a combination. In some embodiments, messaging program 132 is capable of having additional modules incorporated into it (e.g., apps installed on messaging program 132) that can provide additional functionality including but not limited to encrypting authentication token 142 as discussed herein, interfacing with one or more different programs 134, securely storing one or more authentication tokens 142, etc. In some embodiments, messaging program 132 is installed on user device 130 as a factory default, but in other embodiments messaging program 132 is installed on user device 130 by first user 102.

Different program 134 is any of a number of programs running on user device 130 that are distinct from messaging program 132. In some embodiments, different program 134 is a web browser or includes a web browser (e.g., different program 134 is the operating system of user device 130 that includes a built-in web browser). In such embodiments, causing different program 134 to access authentication token 142 from authentication computer system 140 includes using different program 134 to access the authentication computer system 140 using a resource locator included in authentication request 122, sending verification information 310 received from first user 102, and receiving authentication token 142 with different program 134. For example, if different program 134 is (or includes) a web browser, the web browser access a resource locator (e.g., a URL) included in the authentication request 122 and loads a website downloaded using the resource locator. The web browser presents the website to first user 102 (e.g., using a user interface of user device 130), first user 102 inputs verification information 310 using the website, the web browser sends the verification information 310 to authentication computer system 140, and then user device 130 received authentication token 142 with the web browser. After receiving authentication token 142, in some embodiments different program 134 sends authentication token 142 to storage 300 as discussed herein. In other embodiments, different program 134 send authentication token 142 to messaging program 132 which prepares the indication 136 and user device 130 does not retain authentication token 142 thereafter.

In other embodiments, different program 134 is a dedicated application associated with second user 104 (e.g., if second user 104 is ABC Corp., different program 134 is the ABC Corp. App). In some of such embodiments, first user 102 has already logged into the dedicated application (e.g., using verification information 310 from first user 102) and the dedicated application has already received authentication token 142 and stored it in storage 300. In such embodiments, causing the different program 134 to access authentication token 142 received from authentication computer system 140 includes accessing storage 300 and retrieving authentication token 142. In some of such embodiments, the dedicated application is associated with a digital distribution platform (e.g., Apple, Inc.'s App Store™, the Google Play™ store, Microsoft Inc's Windows App Store™). In such embodiments, the digital distribution platform stores information that associates the various applications available for download with the entity or entities that own, maintain, or run the applications. For example, when different program 134 is a dedicated application that is associated with second user 104, the digital distribution platform stores information reflecting that association. In such embodiments, as part of the authentication process discussed herein the dedicated application (or other module of user device 130) sends a request to the digital distribution platform to verify that the dedicated application is associated with second user 104.

In other instances, first user 102 has not already logged into the dedicated application and user device 130 has not already received authentication token 142. In some of such instances, the dedicated application accesses authentication computer system 140 to request authentication token 142 as discussed herein. In such embodiments, user device 130 receives verification information from first user 102 (e.g., via the dedicated application or another program), the dedicated application sends the verification information to authentication computer system 140, and in response to receiving the appropriate verification information 310, authentication computer system 140 sends authentication token 142 to the dedicated application. In other embodiments, if first user 102 has not already logged into the dedicated application and has not already received authentication token 142, user device 130 causes a second different program 134 (not shown) that includes a web browser to request and receive authentication token 142 as discussed herein.

Storage 300 is any of a number of storage hardware components and software to manage the hardware. Storage 300 may be a single hardware memory, or it may be a plurality of memories distributed throughout user device 130. In various embodiments, storage 300 stores one or more cryptographic keys 302. In various embodiments, one cryptographic key 302 is used to encrypt and decrypt communication between user device 130 and messaging computer system 120 as discussed herein. In some embodiments, another cryptographic key 302 is the cryptographic key 404 that user device 130 received in authentication request 122 and that is useable to encrypt authentication token 142 before it is included in indication 136 as discussed herein. In various embodiments, after authentication token 142 has been received from the authentication computer system 140, storage 300 stores authentication token 142. In some of such embodiments, messaging program 132 accesses storage 300 to access authentication token 142 before sending the indication 136 to the messaging computer system 120. Further, in some embodiments, storage 300 retains authentication token 142 to use in response to subsequent authentication requests 122. In various embodiments, storage 300 stores authentication token 142 in a password manager of user device 130. As discussed herein, the password manager may be secured such that verification information 310 from first user 102 is necessary to unlock stored authentication token 142.

In various embodiments, user device 130 receives verification information 310 from first user 102. Such verification information 310 may be any of a number of types of information and may be received via any of a number of interfaces. For example, in some embodiments verification information 310 includes a username and password associated with an account of first user 102 (e.g., an account with second user 104). Such verification information 310 may be received by different program 134 (e.g., via a website when different program 134 is a web browser). In other embodiments, verification information 310 includes biometric information (e.g., a thumbprint of first user 102, a retinal scan of first user 102, a facial scan of first user 102) received by an appropriate input device. In other embodiments verification information 310 is a voice print of first user 102. In some embodiments, verification information 310 includes information about user device 130 (e.g., a unique identifier associated with the user device 130, the model of user device 130, the serial number of user device 130, etc.). In some embodiments, some verification information 310 (e.g., a username and password) is stored in a password manager of user device 130 and this stored verification information 310 is unlocked upon receipt by user device 130 of other verification information 310 (e.g., biometric information). This unlocked, stored verification information 310 may then be sent to authentication computer system 140 as discussed herein. However, no biometric information received from first user 102 is sent from user device 130 to authentication system 140 or to any other computer system. In some embodiments, the verification information 310 that is sent to authentication computer system 140 as discussed herein is derived from verification information 310 input by first user 102. For example, the verification information 310 that is sent to authentication computer system 140 may be a hash or encrypted version of the verification information 310 input by first user 102. In embodiments where biometric information is received from user 102, verification information 310 sent to authentication system 140 includes a result of a biometric authentication (e.g., a comparison of an received thumbprint of first user 102 to a stored thumbprint of first user 102) but not such biometric information itself.

Accordingly, user device 130 is configured to facilitate communication between first user 102 and second user 104 via messaging program 132 within session 100. Moreover, according to the disclosed embodiments, in order to ensure the security of sensitive information, computer system 110 is able to request authentication of first user's 102 identity via messaging program 132. In response, user device 130 is able to provide the requested authentication (e.g., indication 136 of authentication token 142) to computer system 110 and thereby verify first user's 102 identity via messaging program 132 without exchanging verification information 310 with messaging program 132. Because communication over messaging program 132 flows through one or more intermediary computer systems (e.g., messaging computer system 120, CSP system 200) exchanging verification information 310 over messaging program 132 may present security risks. This may especially be the case if the architecture of messaging computer system 120 puts constraints on how and whether information flowing between computer system 110 and messaging computer system 120 may be encrypted. Further, such architecture of messaging computer system 120 may, for example, prevent computer system 110 from using end-to-end encryption to communicate with user device 130. Accordingly, information exchanged between computer system 110 and user device 130 may be accessible by intermediate computer systems (e.g., messaging computer system 120, CSP system 200). Various embodiments disclosed here, however, allow computer system 110 and user device 130 to communicate using messaging program 132 and the intermediary computer systems without exposing either verification information 310 (because such information is sent to authentication computer system 140 rather than via messaging program 132) or authentication token 142 (because authentication token 142 is encrypted with, for example, a cryptographic key 404 included in authentication requests 112, 122).

Figure 4:
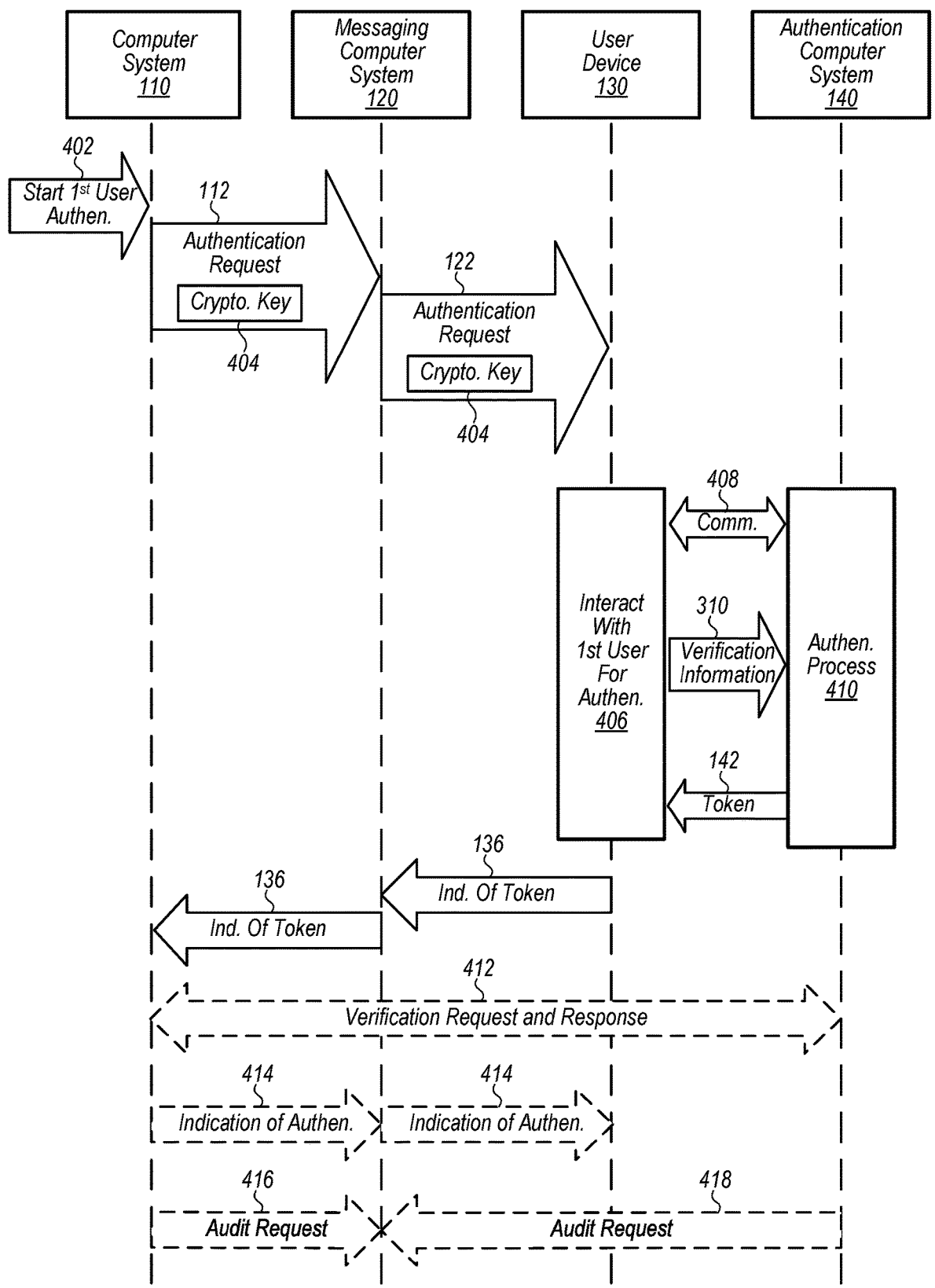
FIG. 4 is a flowchart showing various communications between various components shown in FIG. 1.

Referring now to FIG. 4, a flowchart showing the various communications between the various components shown in FIG. 1 as part of session 100 between first user 102 and second user 104 is depicted in accordance with various embodiments. Computer system 110, messaging computer system 120, user device 130, and authentication computer system 140 send each other various communications as shown in FIG. 4 as part of authenticating first user 102 in session 100.

In various embodiments, the authentication process begins when computer system 110 receives an indication 402 to start the authentication process. The indication 402 may be received as a result of a predefined business process. For example, during session 100, if first user 102 makes a request that relates to sensitive information (e.g., a bank balance, a record of a previously made order for goods, personal profile information, etc.), the business process may require authentication of the first user 102 before allowing that sensitive information to be communicated during session 100. In other embodiments, second user 104 has discretion to decide whether or when first user 102 should be authenticated, and in such embodiments, second user 104 sends indication 402 to computer system 110 when second user 104 determines to do so.

After receiving indication 402, computer system 110 sends authentication request 112 to messaging computer system 120. In various embodiments, authentication request 112 includes various pieces of information including but not limited to an identifier associated with session 100, an authentication request identifier (e.g., a unique alphanumeric or binary code associated with a particular authentication request 112), a first cryptographic key 404 (e.g., a public key of a public-private key pair, and/or a type of requested authentication token (e.g., a token defined according to an authentication standard such as the OAuth 1.0 or OAuth 2.0 standards). In various embodiments, authentication request 112 includes a resource locator (e.g., a URL) useable to direct different program 134 to authentication computer system 140.

After receiving authentication request 112, messaging computer system 120 sends authentication request 122 to user device 130. In various embodiments, authentication request 122 is identical to authentication request 112. But in other embodiments, authentication request 122 is a modified version of authentication request 112 that may, for example, have a different format, be sent using a different communication protocol, include additional information (e.g., an identifier associated with second user 104, a time stamp, etc.), and/or be encrypted according to a cryptographic protocol used to secure communication between messaging computer system 120 and user device 130.

In various embodiments, messaging computer system 120 uses one or more cryptographic protocols to secure communication between messaging computer system 120 and computer system 110 and/or user device 130. In some of such embodiments, communications between messaging computer system 120 and messaging program 132 running on user device 130 is encrypted according to a first cryptographic protocol. In such embodiments, each of messaging computer system 120 and user device 130 store cryptographic keys useable to encrypt sent communications and decrypt received communications. In various embodiments, the first cryptographic protocol may be established before session 100 is initiated (e.g., by messaging computer system 120 and user device 130 exchanging corresponding cryptographic keys during a setup of messaging program 132 subsequent to installation on user device 130) or as session 100 is initiated (e.g., by messaging computer system 120 and user device 130 exchanging corresponding cryptographic keys at the beginning of session 100). The first cryptographic protocol secures communication between messaging computer system 120 and user device 130 such that other computer systems cannot access the secured communication (or cannot access the shared communication without substantial effort and/or time). In contrast, however, in embodiments where the indication 136 of authentication token 142 includes authentication token 142 encrypted according to a second cryptographic protocol, messaging computer system 120 does not store a cryptographic key useable to decrypt encrypted authentication token 142. Thus, in such embodiments, the messaging computer system 120 is not configured to access encrypted authentication token 142.

After receiving authentication request 122, user device 130 interacts with first user 102 via one or more interactions 406. In various embodiments, these interactions 406 include causing messaging program 132 to display on a user interface of user device 130 information indicative of the authorization request 122 (e.g., an icon displayed in messaging program 132), an indication of whether authentication token 142 has been received, and/or whether first user 102 has been authenticated within session 100. In various embodiments, the one or more interactions 406 include prompts to first user 102 to enter verification information 310 to be sent to authentication computer system 140 as discussed herein.

During the authentication process, user device 130 and authentication computer system 140 exchange one or more communications 408. In various embodiments, these communications 408 include verification information 310 sent by user device 130 to authentication computer system 140 during the authentication process and a message containing authentication token 142. Various other communications 408 may be exchanged during the authentication process including but not limited to, access requests from user device 130 to authentication computer system 140, locators (e.g., URLs) sent by authentication computer system 140 to user device 130, website information (e.g., html files) communicated between user device 130 and authentication computer system 140, etc.

In some embodiments, different program 134 sends a token access request to authentication computer system 140. In response to the token access request, authentication computer system 140 sends a verification request to the different program 134 requesting verification information 310 for authentication computer system 140 to use to determine whether to send an authentication token 142 to user device 130. For example, in embodiments where different program 134 is a web browser the verification request includes information useable by the web browser to cause a verification website to be displayed to first user 102 (e.g., on a user interface of user device 130). In such embodiments, verification information 310 is received via the verification website.

In response to communications 408 from user device 130 and/or receiving verification information 310 from user device 130, authentication computer system 140 performs an authentication process 410 to determine whether to send authentication token 142 to user device 130. In response to determining to send authentication token 142, authentication computer system 140 sends authentication token 142 to user device 130. Authentication token 142 is useable by messaging program 132 to authenticate first user 102 of user device 130 within session 100. It will be understood that authentication can be provided using one or more what are known as factors of authentication: (a) knowledge factors (e.g., something the user knows like a password), (b) ownership factors (e.g., something the user has like a security token), and (c) inherence factors (e.g., something the user is or does like a biometric identifier). Authentication token 142 may be any of a number of type (b) ownership factors that are electronically transferable from authentication computer system 140 to user device 130 (e.g., a software token). As discussed here, verification information 310 received from first user 102 may be a type (a) knowledge factor (e.g., a username and password) and/or a type (c) inherence factor (e.g., a facial scan). Accordingly, in various embodiments, the authentication techniques discussed herein are multi-factor (e.g., because they use more than one type of authentication factor). In various embodiments, authentication token 142 is a software token generated using a shared secret algorithm. In other embodiments, authentication token 142 is a software token generated using public-key cryptography. In various embodiments, authentication computer system 140 sends authentication token 142 in an encrypted form (e.g., encrypted using cryptographic key 404) and may be transmitted along with additional information. In various embodiments, user device 130 receives authentication token 142 via the different program 134 that is used to request the authentication token 142, but in other embodiments authentication token 142 is received via another module of user device 130.

After receiving authentication token 142, user device 130 sends an indication 136 of authentication token 142 to messaging computer system 120. In various embodiments, indication 136 includes authentication token 142 along with additional information such as a response identifier that corresponds to the request identifier included in the authentication request 122. In various embodiments, indication 136 includes the authentication token 142 encrypted using cryptographic key 404 that was included in authentication request 122.

In some embodiments discussed above in connection to FIG. 2, computer system verifies the received indication 136 by sending a verification request 412 based on the indication 136 to authentication computer system 140. In response to the verification request 412, authentication computer system 140 sends a second indication of the authentication token 142 that corresponds to the indication 136 to computer system 110. Computer system 110 analyzes the indication 136 and the second indication received in response to the verification request 412 to determine whether the indication 136 and second indication correspond to the same authentication token 142.

In various embodiments, messaging computer system 120 receives an indication 414 from computer system 110 of whether first user 102 has been authentication in session 100 (e.g., an indication showing that indication 136 has been received by computer system 110 and verified as discussed herein). In various embodiments, messaging computer system 120 sends to messaging program 132 running on user device 130 the indication 414 of whether first user 102 has been authenticated in session 100. Further, in some embodiments, a second user device (not shown) is also associated with first user 102, and in some of such embodiments, messaging computer system 120 also sends to the second user device an indication (not shown) of whether first user 102 has been authentication in session 100. In some of such embodiments, this indication does not include the authentication token 142 (either in encrypted or unencrypted form).

In various embodiments, computer system 110 sends an audit request 416 to messaging computer system 120 to determine whether messaging computer system 120 accessed the authentication token 142. In embodiments where the indication 136 includes an encrypted version of authentication token 142, for example, the audit request 416 may request information showing that the encrypted authentication token 142 was not decrypted by messaging computer system 120 or another computer system on the transmission path (e.g., the encrypted authentication token 142 in the indication 136 received by messaging computer system 120 matches the encrypted authentication token 142 received by computer system 110). Similarly, in various embodiments authentication computer system 140 sends an audit request 418 to messaging computer system 120 determine whether messaging computer system 120 accessed the authentication token 142. In such embodiments, in response to either or both audit request 416 and audit request 418, messaging computer system 120 responds to the requesting computer system by sending information showing that the encrypted authentication token 142 was not decrypted by messaging computer system 120.

Thus, in various embodiments disclosed herein, computer system 110 requests authentication from user device 130, receives authentication information (e.g., the indication 136) that user device 130 received from authentication computer system 140, and authenticates first user 102 in session 100. In one example according to the disclosed embodiments, Charles (a first user 102) uses his smartphone (e.g., a user device 130) to communicate with XYZ, Inc. (a second user 104) about his medical records using a messaging program 132 stored on the smartphone. Before XYZ, Inc. discloses sensitive medical information, XYZ, Inc. asks Charles to perform an authentication process and sends an authentication request 112 via the messaging program 132. Charles accesses the received authentication request 122 (e.g., by tapping an icon on the smartphone's user interface), which launches a web browser (e.g., a different program 134) that loads a website from an address pointed to be a locator that was included in received authentication request 122. Charles logs into the website, verifies his identity (e.g., with a username and password), and his smartphone receives authentication token 142. The smartphone in turn sends indication 136 of the received authentication token 142 to XYZ, Inc. via messaging program 132. Upon receiving indication 136 and using it to authenticate Charles in the session 100, XYZ, Inc. sends the requested medical information to Charles's smartphone.

In another embodiment, Penelope (a first user 102) uses her tablet computer (e.g., a user device 130) to communicate with ABC Corp. (a second user 104) about her bank account using a messaging program 132 stored on the tablet computer. Penelope's tablet computer also has the ABC Corp. application (e.g., a different program 134) installed on it, and Penelope is currently logged into the ABC Corp. application. Before ABC Corp. discloses sensitive financial information, ABC Corp. asks Penelope to perform an authentication process and sends an authentication request 112 via the messaging program 132. Penelope accesses the received authentication request 122 (e.g., by giving a verbal command to a personal assistant program running on her tablet computer) which causes the tablet computer to access the ABC Corp. application. Having logged in previously and received an authentication token 142 from authentication computer system 140, the ABC Corp. application accesses the authentication token 142 in storage 300 and passes it to the messaging program 132. Messaging program 132 sends indication 136 of the previously-received authentication token 142 to ABC Corp. via messaging program 132. Upon receiving indication 136 and using it to authenticate Penelope in the session 100, ABC Corp. sends the requested financial information to Penelope's tablet computer.

Figure 5:
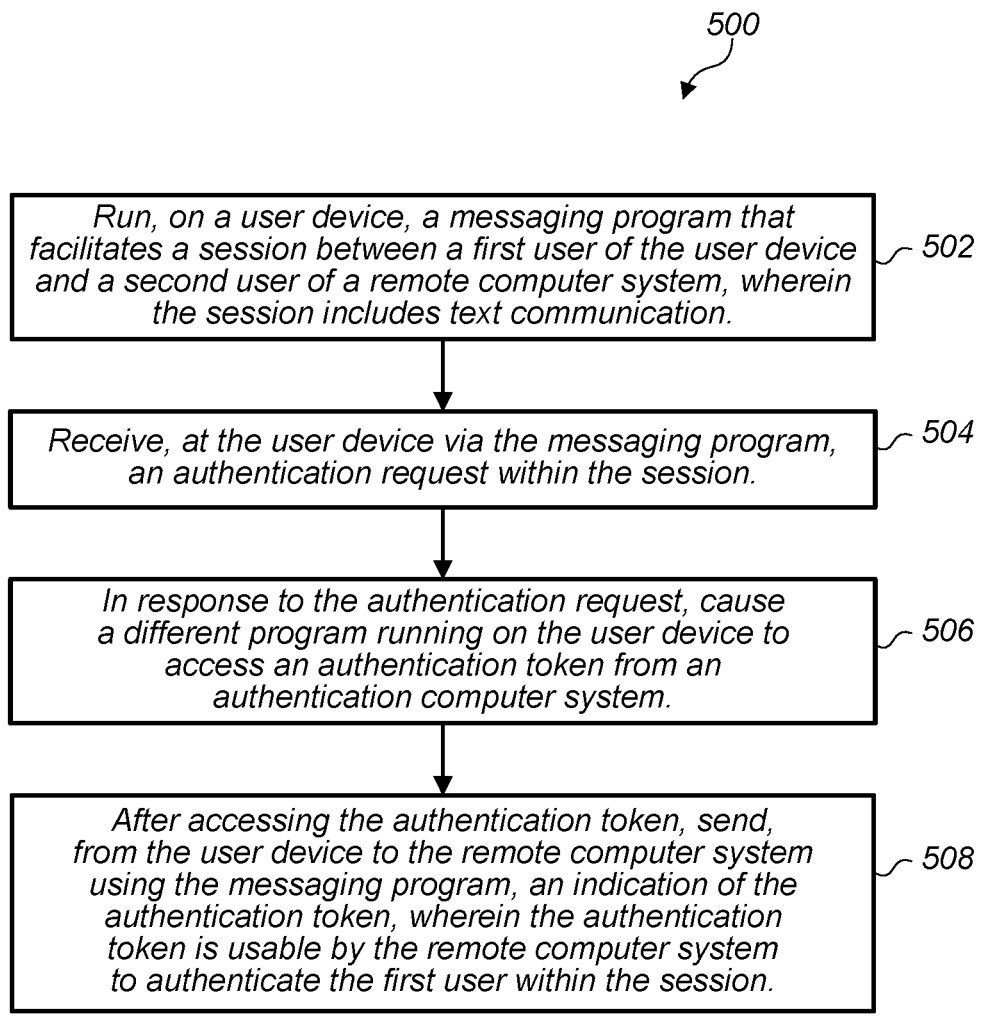
FIGS. 5-8 are flowcharts illustrating embodiments of authentication methods in accordance with the disclosed embodiments.

FIGS. 5, 6, 7, and 8 illustrate various flowcharts representing various disclosed methods implemented with the components depicted in FIG. 1. Referring now to FIG. 5, a flowchart illustrating an embodiment of an authentication method 500 is shown. In various embodiments, the various actions associated with method 500 are performed by user device 130. At block 502, user device 130 runs messaging program 132 that facilitates session 100 between first user 102 of the user device 130 and second user 104 of a remote computer system 110. As discussed herein, in various embodiments, session 100 includes text communication. At block 504, user device 130 receives via messaging program 134 authentication request 122 within session 100. At block 506, in response to authentication request 122, user device 130 causes different program 134 running on the user device 130 to access authentication token 142 from authentication computer system 140. At block 508, after accessing authentication token 142, user device 130 sends, to remote computer system 110 using messaging program 132, indication 136 of authentication token 142. As discussed herein, in various embodiments, authentication token 142 is usable by remote computer system 110 to authenticate first user 102 within the session 100.

Figure 6:
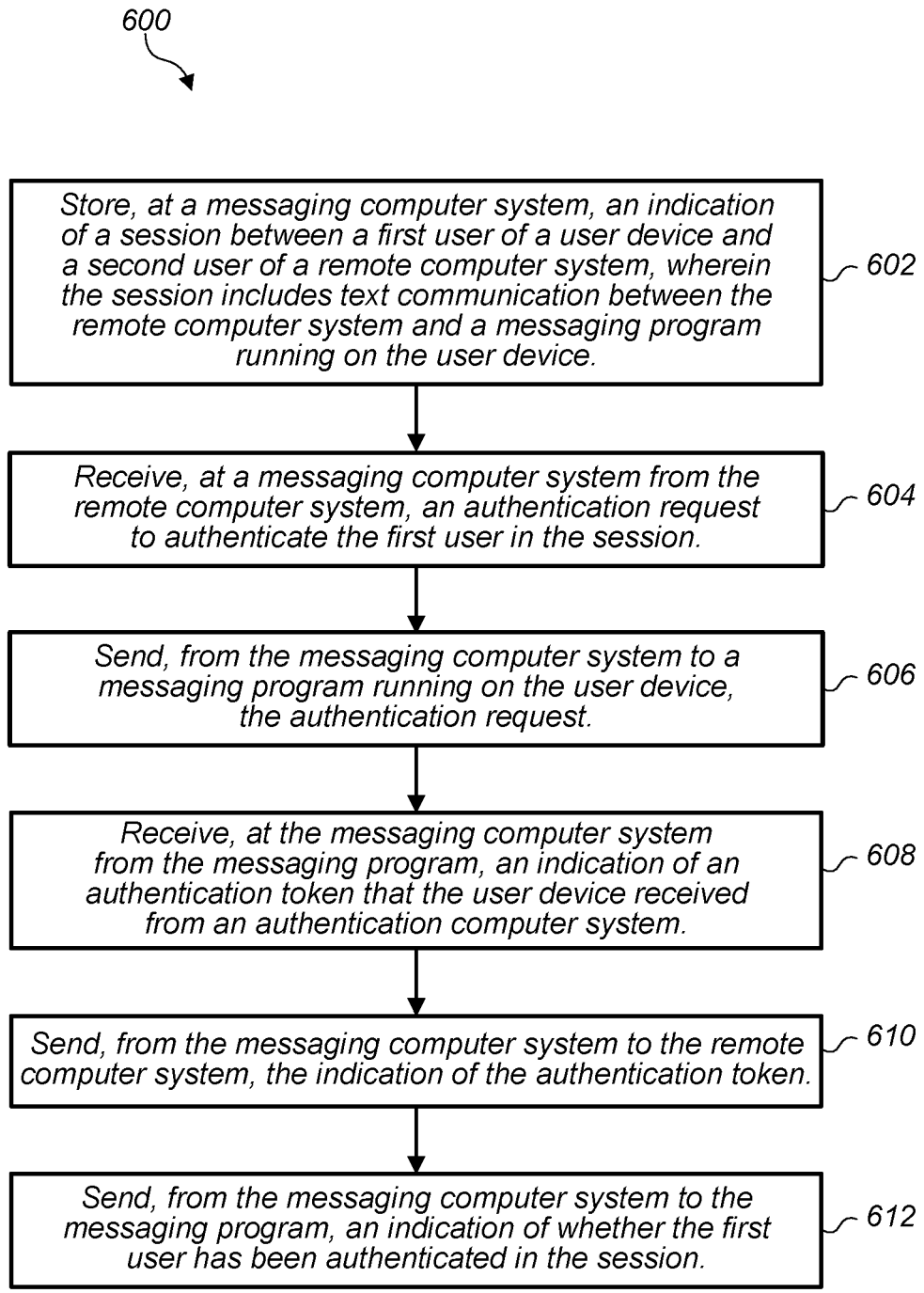

Referring now to FIG. 6, a flowchart illustrating an embodiment of an authentication method 600 is shown. In various embodiments, the various actions associated with method 600 are performed by messaging computer system 120. At block 602, messaging computer system 120 stores an indication of session 100 between first user 102 of user device 130 and second user 104 of remote computer system 110. As discussed herein, in various embodiments, session 100 includes text communication between remote computer system 110 and messaging program 132 running on user device 130. At block 604, messaging computer system 120 receives, from remote computer system 110, first authentication request 112 to authenticate first user 102 in session 100. At block 606, messaging computer system 120 sends second authentication request 122 to messaging program 132 running on user device 130. At block 608, messaging computer system 120 receives from messaging program 132 indication 136 of authentication token 142 that user device 130 received from authentication computer system 140. At block 610, messaging computer system 120 sends to remote computer system 110 indication 136 of authentication token 142. At block 612, messaging computer system 120 sends to messaging program 132 an indication of whether first user 102 has been authenticated in session 100.

Figure 7:
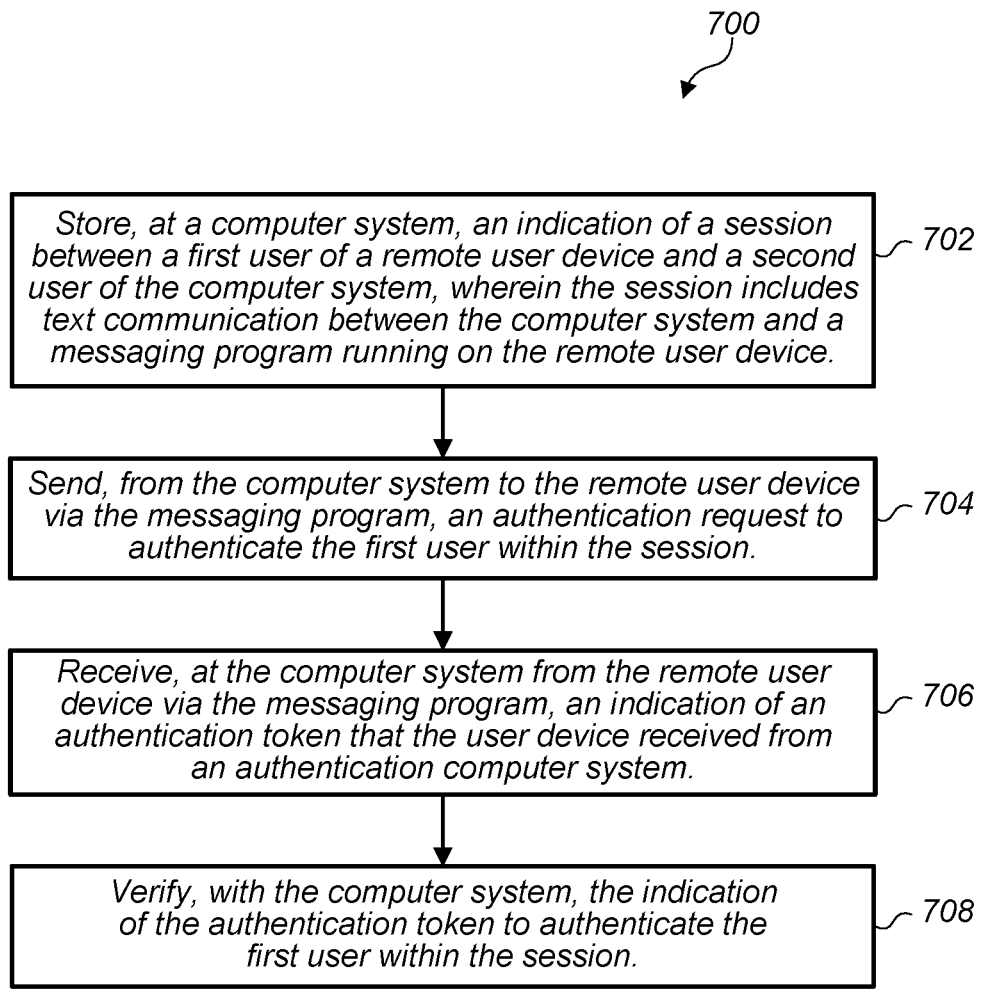

Referring now to FIG. 7, a flowchart illustrating an embodiment of an authentication method 700 is shown. In various embodiments, the various actions associated with method 700 are performed by computer system 110. At block 702, computer system 110 stores an indication of session 100 between first user 102 of remote user device 130 and second user 104 of computer system 110. As discussed herein, in various embodiments, session 100 includes text communication between computer system 110 and messaging program 132 running on remote user device 130. At block 704, computer system 110 sends, to remote user device 130 via messaging program 132, authentication request 112 to authenticate first user 102 within session 100. At block 706, computer system 110 receives, from remote user device 130 via messaging program 132, indication 136 of authentication token 142 that user device 130 received from authentication computer system 140. At block 708, computer system 110 verifies indication 136 of authentication token 142 to authenticate first user 102 within session 100.

In various embodiments, the authentication request 112 includes an authentication request indicator and a first cryptographic key 404; the indication 136 of the authentication token 142 includes the authentication token 142 encrypted using the first cryptographic key 404 and an authentication request response indicator; and verifying the indication 136 of the authentication token 142 includes: decrypting the authentication token 142 using a second cryptographic key that corresponds to the first cryptographic key 404; and determining that the authentication request response identifier corresponds to the authentication request identifier. In various embodiments, verifying the indication 136 of the authentication token 142 includes: sending, from the computer system 110 to the authentication computer system 140, a verification request 412 based on the indication 136 of the authentication token 142 received from the remote user device 130; receiving, at the computer system 110 from the authentication computer system 140, a second indication of the authentication token 142, wherein the second indication corresponds to the indication 136 of the authentication token 142 that the authentication computer system 140 sent to the remote user device 130; and analyzing the indication 136 of the authentication token 142 received from the remote user device 130 and the second indication of the authentication token 142 to determine that the indication 136 and the second indication correspond to the same authentication token 142.

Figure 8:
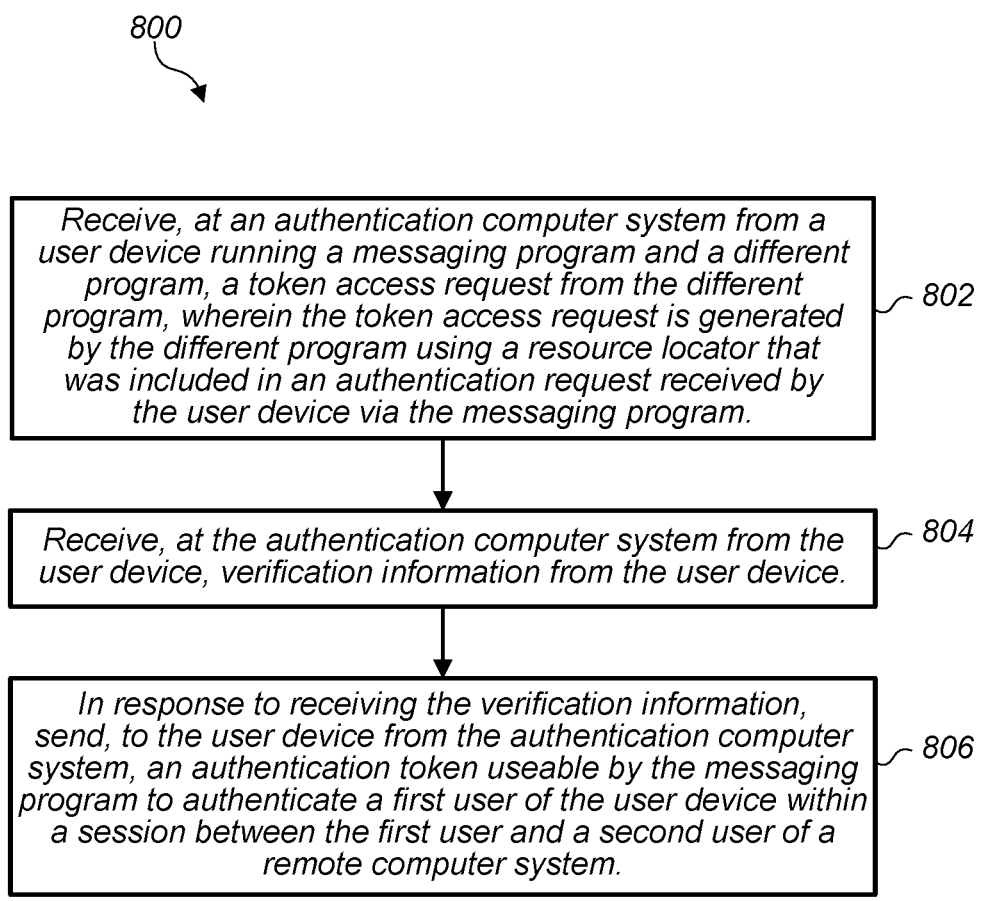

Referring now to FIG. 8, a flowchart illustrating an embodiment of an authentication method 800 is shown. In various embodiments, the various actions associated with method 800 are performed by authentication computer system 140. At block 802, authentication computer system 140 receives, from user device 130 running messaging program 132 and different program 134, a token access request from different program 134. In such embodiments, the token access request is generated by different program 134 using a resource locator that was included in authentication request 122 received by user device 130 via messaging program 132. At block 804, authentication computer system 140 receives from user device 130 verification information 310 from user device 130. At block 806, in response to receiving verification information 310, authentication computer system 140 sends to user device 130 authentication token 142 that is useable by messaging program 132 to authenticate first user 102 of user device 130 within session 100 between first user 102 and second user 104 of remote computer system 110.

In various embodiments, authentication method 800 further comprises: receiving, at the authentication computer system 140 from the remote computer system 110, a verification request 412 associated with the authentication token 142; and in response to the verification request 412, sending, from the authentication computer system 140 to the remote computer system 110, an indication of the authentication token 142 sent to the user device 130. In various embodiments, authentication method 800 further comprises: in response to the token access request, sending a verification request from the authentication computer system 140 to the different program 134; wherein the different program 134 comprises a web browser, the verification request includes information useable by the web browser to cause a verification website to be displayed to the first user 102, and the verification information 310 is received via the verification website. In various embodiments, the different program 134 is a dedicated application associated with the second user 104, the verification information 310 is received via the dedicated application, and sending the authentication token 142 to the user device 130 includes sending the authentication token 142 to the dedicated application.

Figure 9:
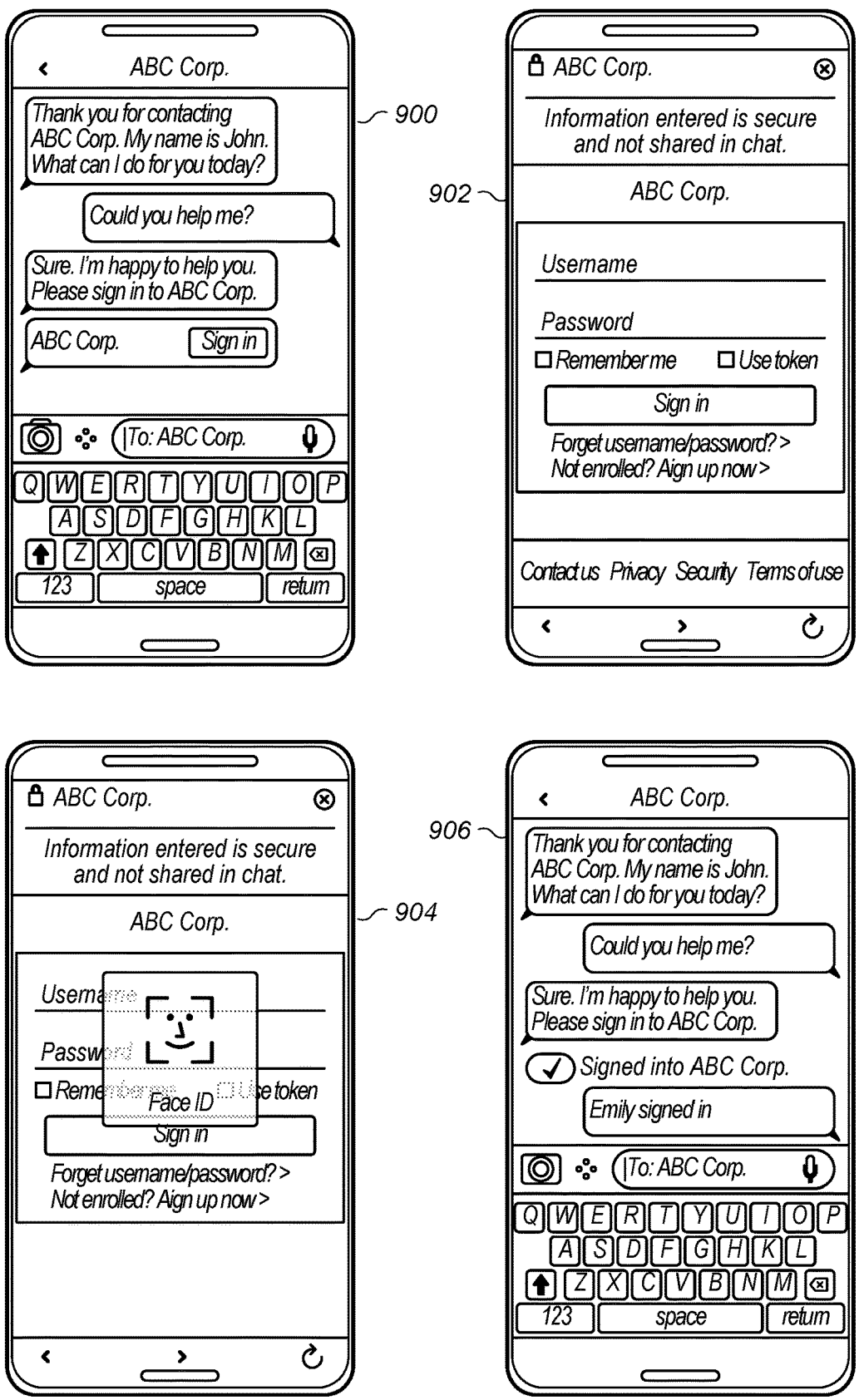
FIG. 9 is a flowchart illustrating exemplary user device user interface screens in accordance with the disclosed embodiments.

Referring now to FIG. 9, a series of exemplary user device 130 user interface screens 900, 902, 904, and 906 showing certain portions of the authentication process discussed herein are shown. In the user interface screens shown in FIG. 9, first user 102 is using a user device 130 that is a smartphone, second user 104 is ABC Corp., and first user 102 is communicating with ABC Corp. about something triggers ABC Corp. to request authentication of first user's 102 identity. Screen 900 shows session 100 between first user 102 and second user 104 communicated via messaging program 132. Second user 104 thanks first user 102 for contacting ABC Corp. First user 102 asks for help (e.g., help with an order for goods, help with accessing a bank account, etc.). As a result, second user 104 requests that first user 102 sign into ABC Corp. and sends an authentication request 112/122 with a locator (shown as the "Sign In" button that when activated will launch a web browser and cause the web browser to access the ABC Corp. website). Upon first user 102 activating the "Sign In" button, user device 130 displays screen 902 which depicts an ABC Corp. website with fields for first user's 102 username and password. Alternatively, user device 130 displays screen 904 which depicts the ABC Corp. website with the same username and password fields, but with an additional icon prompting first user 102 to identify himself by facial scan as discussed herein. Upon a successful facial scan, user device 130 accesses a password manager (e.g., a module of storage 300) storing first user's 102 username and password and automatically fills in the username and password. Alternatively, information indicative of the facial scan itself may be transmitted to the ABC Corp. website. After successfully logging into ABC Corp's website and receiving authentication token 142 as discussed herein, user device 130 displays screen 906 showing that first user 102 has signed into ABC Corp. and that first user 102 has been authenticated within session 100. This screen 906 results from user device 130 sending indication 136 to computer system 110 via messaging computer system 120 as discussed herein.

Exemplary Computer System

Figure 10:
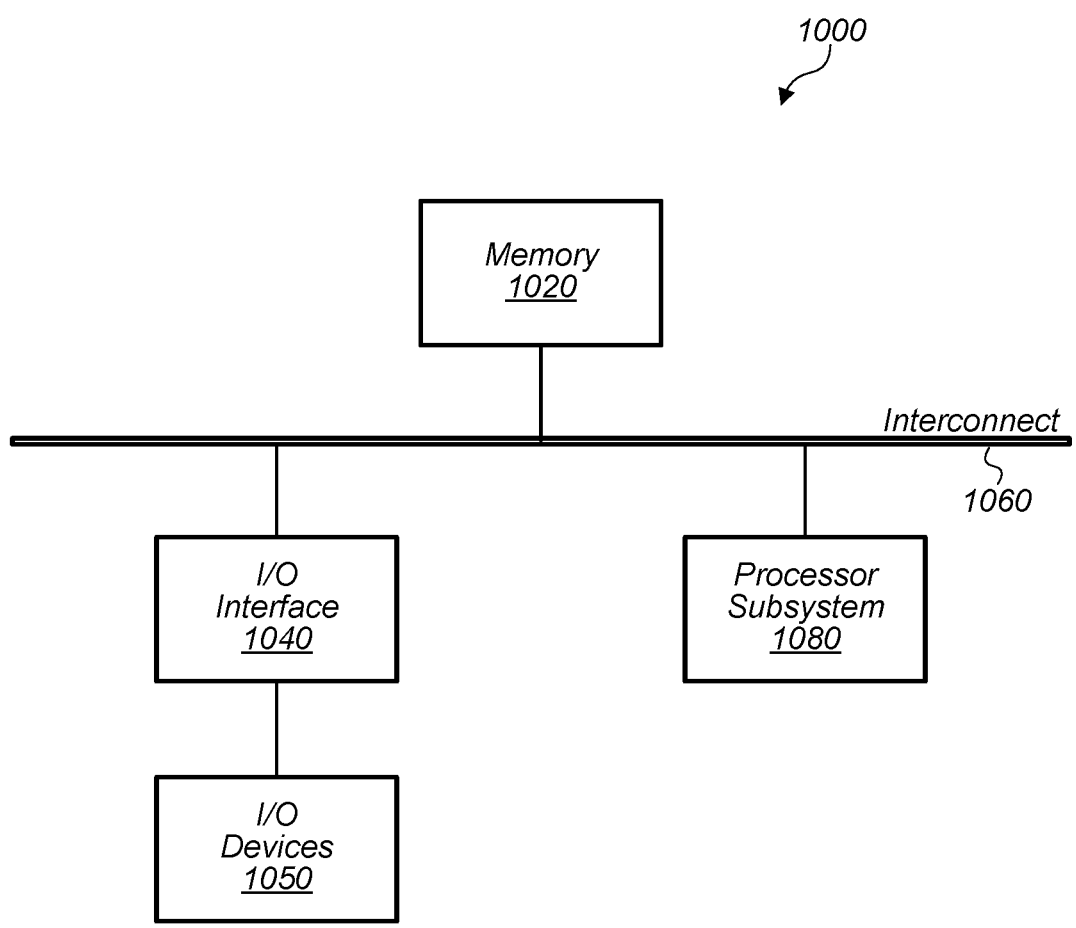
FIG. 10 is a block diagram of an exemplary computer system, which may implement various components of FIGS. 1, 2, and 3.

Turning now to FIG. 10, a block diagram of an exemplary computer system 1000, which may implement the various components of computer system 110, messaging computer system 120, user device 130, and/or authentication computer system 140 is depicted. Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Computer system 1000 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable to store program instructions executable by processor subsystem 1080 to cause system 1000 perform various operations described herein. System memory 1020 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various embodiments described herein may gather and/or use data available from specific and legitimate sources to improve the delivery to users of invitational content or any other content that may be of interest to them. The present disclosure contemplates that, in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A method comprising:
running, on a user device, a messaging program that facilitates a session between a first user of the user device and a second user of a remote computer system, wherein the session includes text communication;
receiving, at the user device via the messaging program, an authentication request within the session;
in response to the authentication request, causing a different program running on the user device to access a memory of the user device and retrieve an authentication token from an authentication computer system, wherein the different program is an application associated with the second user, wherein prior to receiving the authentication request the first user has logged into the application, and wherein the application received the authentication token from the authentication computer system as a result of the first user logging in and stored the authentication token in the memory; and
after accessing the authentication token, sending, from the user device to the remote computer system using the messaging program, an indication of the authentication token, wherein the authentication token is usable by the remote computer system to authenticate the first user within the session.

2. The method of claim 1, wherein the application associated with the second user is associated with a digital distribution platform; the method further comprising:
sending, from the user device to the digital distribution platform, a request to verify that the application associated with the second user is associated with the second user.

3. The method of claim 1, wherein causing the different program to access the authentication token includes receiving biometric information from the first user.

4. The method of claim 1, wherein the first user has logged into the application by:
receiving, using the different program, verification information from the first user;
sending, from the user device to the authentication computer system, the verification information; and
receiving, at the user device and from the authentication computer system, the authentication token as a result of sending the verification information.

5. The method of claim 1, wherein the authentication token is stored in a password manager of the user device.

6. The method of claim 5,
wherein causing the different program running on the user device to access the memory device and retrieve an authentication token includes prompting the first user for verification information; and
wherein the password manager is unlocked using the verification information prior to retrieval of the authentication token.

7. The method of claim 6, wherein the verification information is biometric information received from the first user, and wherein the biometric information is not transmitted off of the user device.

8. The method of claim 1,
wherein the authentication request includes a cryptographic key; and
wherein the indication of the authentication token comprises the authentication token encrypted using the cryptographic key.

9. An apparatus comprising:
a computer processor system; and
a computer memory storing instructions that when executed by the computer processor system causes the apparatus to perform operations comprising:
running a messaging program that facilitates a session between a first user of the apparatus and a second user of a remote computer system, wherein the session includes text communication;
receiving, via the messaging program, an authentication request within the session, wherein the authentication request includes a resource locator;
in response to the authentication request, causing a different program running on the apparatus to access an authentication token from an authentication computer system by:
using the different program to access the authentication computer system using the resource locator;
sending, from the apparatus to the authentication computer system, verification information; and
receiving, from the authentication computer system to the apparatus, the authentication token; and
after accessing the authentication token, sending, to the remote computer system using the messaging program, an indication of the authentication token, wherein the authentication token is usable by the remote computer system to authenticate the first user within the session.

10. The apparatus of claim 9, wherein the authentication token is stored in a password manager of the apparatus.

11. The apparatus of claim 9,
wherein the authentication request includes a cryptographic key; and
wherein the indication of the authentication token comprises the authentication token encrypted using the cryptographic key.

12. The apparatus of claim 9, wherein causing the different program to access the authentication token includes receiving biometric information from the first user.

13. The apparatus of claim 9, wherein causing the different program to access the authentication token includes:
receiving, using the different program, verification information from the first user.

14. The apparatus of claim 9, wherein the operations further include:
storing the authentication token;
receiving, via the messaging program, a subsequent authentication request; and
sending, in response to the subsequent authentication, the authentication token to the remote computer system.

15. The apparatus of claim 9, further comprising:
a display;
wherein a first user interface of the messaging program is displayed on the display during the receiving and the sending; and
wherein a second user interface of the different program is displayed on the display when the different program is accessing the authentication token.

16. A method comprising:
storing, at a messaging computer system, an indication of a session between a first user of a user device and a second user of a remote computer system, wherein the session includes text communication between the remote computer system and a messaging program running on the user device;

receiving, at the messaging computer system from the remote computer system, a first authentication request to authenticate the first user in the session;

sending, from the messaging computer system to the messaging program running on the user device, a second authentication request;

receiving, at the messaging computer system from the messaging program, an indication of an authentication token that the user device received from an authentication computer system;

sending, from the messaging computer system to the remote computer system, the indication of the authentication token; and sending, from the messaging computer system to the messaging program, an indication of whether the first user has been authenticated in the session wherein the communications between the messaging computer system and the messaging program are encrypted according to a first cryptographic protocol;

wherein the messaging computer system stores a cryptographic key useable to decrypt the first cryptographic protocol;

wherein the indication of the authentication token is encrypted according to a second cryptographic protocol; and wherein the messaging computer system does not store a cryptographic key useable to decrypt the second cryptographic protocol.

17. The method of claim 16, further comprising:
wherein the second authentication request includes a cryptographic key; and
wherein the indication of the authentication token is encrypted using the cryptographic key.

18. The method of claim 16, wherein the indication of the authentication token is encrypted, the method further comprising:
receiving, at the messaging computer system, an audit request to determine whether the messaging computer system decrypted the encrypted indication of the authentication token; and
in response to the audit request, sending, from the messaging computer system, information showing that the encrypted indication of the authentication token was not decrypted by the messaging computer system.

19. The method of claim 16, further comprising:
facilitating, with the messaging computer system, the session between the first user of the user device and the second user of the remote computer system, wherein the facilitating includes:
relaying communications from the remote computer system to the user device;
relaying communications from the user device to the remote computer system; and
associating the relayed communications with the session.

20. The method of claim 16, further comprising:
sending, to a second user device associated with the first user, an indication of whether the first user has been authenticated in the session without sending the authentication token.

\* \* \* \* \*